SAMUEL B. BOWEN & A. M. ABBOT.

Improvement in Gang Plows.

No. 124,480.  Patented March 12, 1872

124,480

UNITED STATES PATENT OFFICE.

SAMUEL D. BOWEN AND AMERICAS M. ABBOT, OF STOCKTON, CALIFORNIA.

IMPROVEMENT IN GANG-PLOWS.

Specification forming part of Letters Patent No. 124,480, dated March 12, 1872.

SPECIFICATION.

*To all whom it may concern:*

Be it known that we, SAMUEL B. BOWEN and AMERICAS M. ABBOT, of Stockton, in the county of San Joaquin and State of California, have invented certain new and useful Improvement in Gang-Plows; and the following is a full, clear, and exact description of the same, reference being had to the accompanying drawing making a part of this specification, in which—

Figure 1:
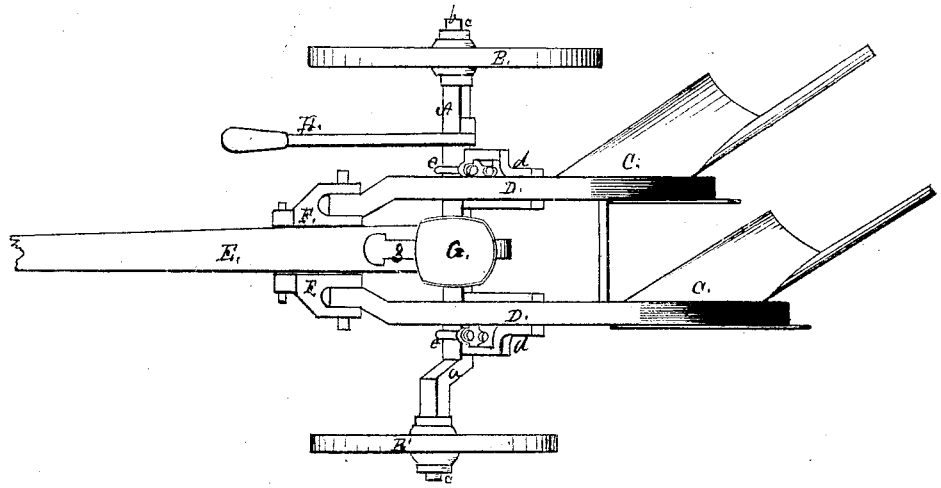
Figure 2:
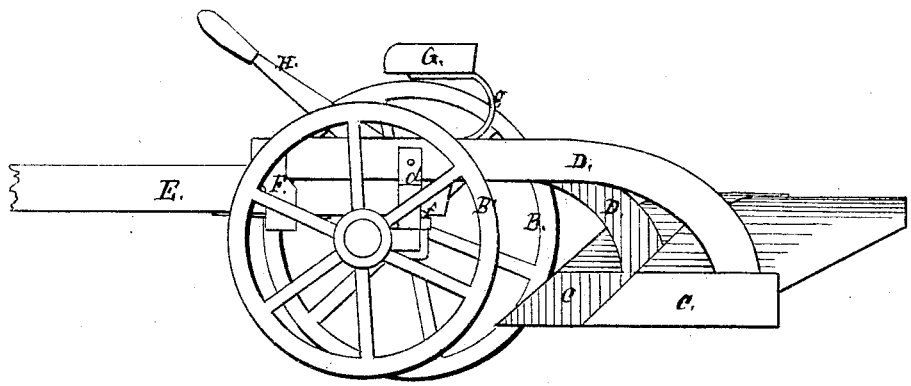
Figure 3:

Figure 1 represents a plan or top view of our improvement in a gang-plow or cultivator. Fig. 2 shows a landside view of the same in perspective. Fig. 3 is a view of the crank-axle detached.

Our invention relates to that class of agricultural implements known as wheel or buggy gang-plows or cultivators; and it consists in the crank or bent axle and its connecting-links, and movable-joint fastenings of the plow-beams to the axle and pole or tongue, and the hand-lever secured to the axle, whereby the depth of the furrow is regulated, as also the draft, and providing means by which the plowshares and points can be lifted above the surface of the ground clear from the earth in going to and from the field.

To enable others to make and use our improved gang-plow or cultivator, we will describe it more in detail, referring to the drawing and to the letters marked thereon.

The axle A may be made of a square iron bar, of suitable size for the required strength, with a bend, *a*, near the end on the landside, giving it the form of a crank, with the axle-arms *b b* and nuts *c c* for the securing of the wheels B B' in the usual manner, the wheel B' on the landside being of less diameter than the wheel B, so that the plows C C incline toward the near or landside when they are let down for operating. To the axle A are secured iron brackets or standards *d d* by clip-irons *e e*, to which the plow-beams D D are pivoted about one-third of the distance from their front ends; also the pole or tongue E is attached, by a ring-staple, *f*, to the axle A at its rear end, the pin or bolt connected with it passing up through an elongated opening crosswise in the pole, by which it can be inclined either to the right or left, and held in position by a nut, the same securing the spring *g*, on which the driver's seat G is elevated, the ring *f* fitting on the journal *f'* in the center of the axle A. The front ends of the plow-beams D D are secured to the tongue E by jointed links F F, secured by a movable plate on the under side. To the axle A is secured a hand-lever, H, in such a position as to be conveniently operated by the right hand of the driver in the seat G. When the plows C C are let down to turn the soil the handle or lever H will be in a vertical position and the beams D D will rest upon the axle A; but when the lever H is pressed forward the plows *c c* are raised up, as shown in Fig. 2.

Having thus fully described our invention, what we claim as new, and desire to secure by Letters Patent, is—

The bent or crank axle A, having rigid standards *d d* secured to it at right angles with said crank, in combination with the plow-beams D D, when the said beams are pivoted to the jointed links F F, and are secured to the under side of the pole or tongue E, and operated by the lever H rigidly attached to the crank-axle, substantially in the manner herein shown and described.

In testimony whereof we jointly subscribe our names.

SAML. B. BOWEN.
AMERICAS M. ABBOT.

In presence of—
WILLIAM KING,
J. E. HOUGHTON.